M. JOHNSON.
HARROW.
No. 85,451. Patented Dec. 29, 1868.
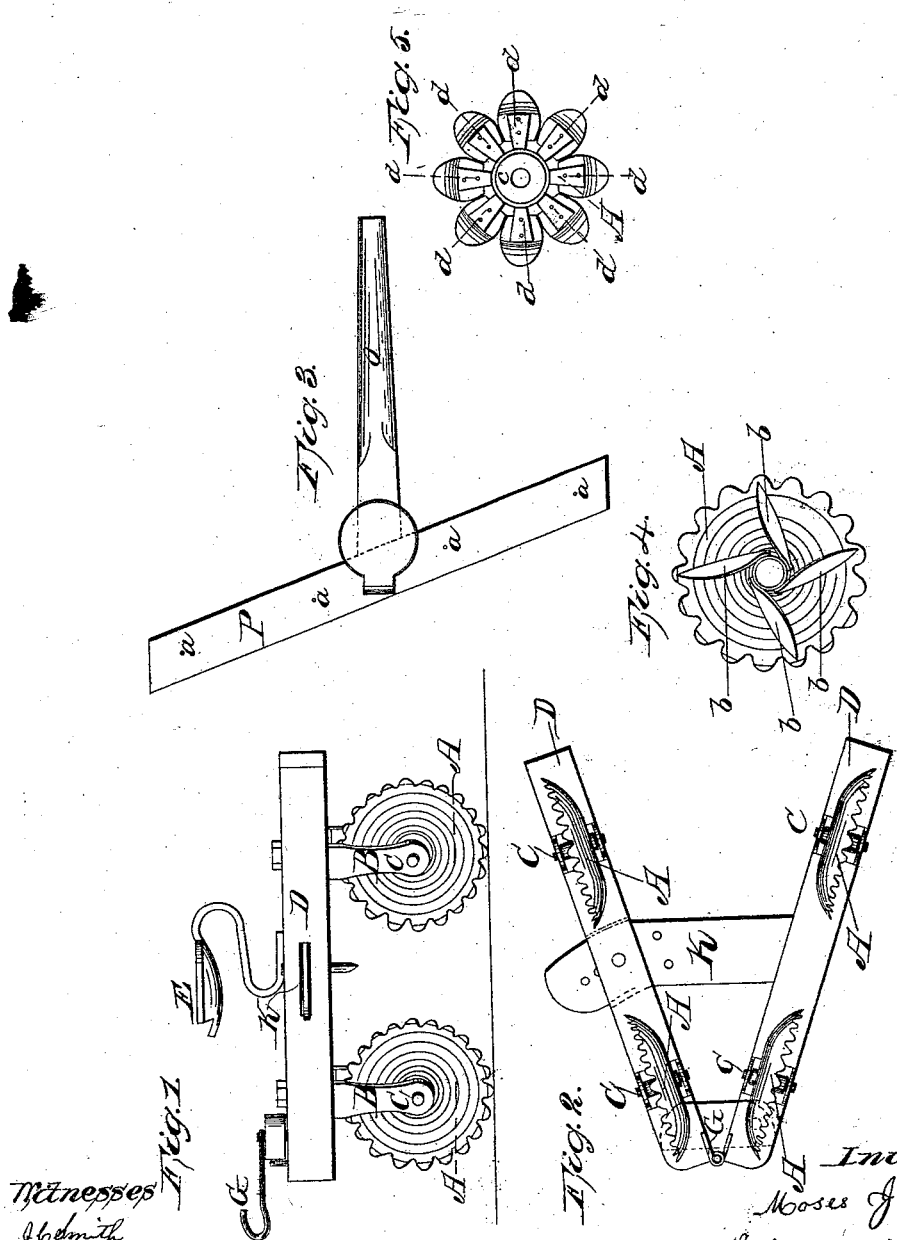

UNITED STATES PATENT OFFICE.

MOSES JOHNSON, OF THREE RIVERS, MICHIGAN.

IMPROVEMENT IN PLOW.

Specification forming part of Letters Patent No. 85,451, dated December 29, 1868.

*To all whom it may concern:*

Be it known that I, MOSES JOHNSON, of Three Rivers, in the county of St. Joseph and State of Michigan, have invented a new and valuable Improvement in Plows; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of my device; Fig. 2 is an inverted plan view thereof; and Figs. 3, 4, and 5 are details.

The nature of my invention consists in providing for plow and cultivator purposes a series of corrugated convex wheels and adjusting them to beams set diagonally to the line of draft.

The letters A of the drawings are representations of my wheels. The peripheries of these wheels are corrugated, and the points of the corrugations are made sharp, to enable them to penetrate the ground with greater ease. I prefer to attach them to the beam by means of pins and stirrups, as shown on Figs. 1 and 2; but they may also be attached by a variety of other means. The form 4, for example, is so constructed as to adapt it to revolving around a stationary axle, instead of being attached to the axle, which revolves on bearings in the stirrups. Letters B represent the stirrups, and letters C the axles or pins. The letters D, on Figs. 1 and 2, represent the beams of the plow. Letter E is the driver's seat, and letter G the hook to which the motive power is attached. The letter K is a punctured arm adapted to receive a pin, M, and thereby to regulate and gage the width of the furrow to be plowed. The manner of this adjustment is fully shown in Fig. 2.

When my device is to be used for cultivating corn, potatoes, and the like, it is sometimes desirable to adjust the wheels on both beams so that the convex sides thereof shall stand all one way, and by that means the furrow will be turned one way only, either to the right or left, as the operator may desire.

To plow a deep furrow, I adjust the beams of forms 1 and 2 to a sharp angle, the rule being the sharper the angle the deeper the furrow, and vice versa.

Fig. 3 represents my device as applicable more especially to field-plowing. It consists of a tongue and cross-bar of the form represented, the former of which is marked O and the latter P. The letters *a a a a* show the points at which the wheels are attached. The beam or cross-bar P is adjusted on an angle of about fifty degrees with the tongue, in order to place the convex wheels on the proper line with the draft.

I usually place twelve wheels on this beam P, and I find one team of two good horses abundantly sufficient for its use, even in greensward.

The fact that these wheels perform their office by a revolving motion, instead of the straight shoveling process of the common plow, secures for my plow a great saving of motive power.

For greensward or rooty soil it is desirable to place revolving cutters on the beam P, in front of the wheels.

The form of wheel shown on Fig. 4 is substantially the one I design for ordinary use. It has wings, (marked *b b b b*,) which, when in use, aid in segregating and loosening the soil.

Fig. 5 shows a method by which I sometimes construct the corrugated wheel. It is composed of a hub, *c*, resembling the common wagon-hub for wheels, and also arms *d*, to which convex and corrugated flanges are firmly attached. In this form it is light and strong, and any worn-out or broken flange may be easily replaced by a new one.

What I claim as my invention, and desire to secure by Letters Patent, is—

A plow having wheels A, beams D, stirrups B, axles C, and punctured arm K, constructed, arranged, and operating substantially as described.

In testimony that I claim the above I have hereunto subscribed my name in the presence of two witnesses.

MOSES JOHNSON.

Witnesses:
L. N. STRAW, Jr.,
JNO. B. HANDY.